United States Patent
Hodges et al.

(10) Patent No.: US 12,121,888 B2
(45) Date of Patent: Oct. 22, 2024

(54) RARE-EARTH SILICATE COMPOSITIONS AND THEIR PREPARATION

(71) Applicant: UOP LLC, Des Plaines, IL (US)

(72) Inventors: James M. Hodges, Evanston, IL (US); Mimoza Sylejmani-Rekaliu, Bensenville, IL (US); Paulina Jakubczak, Elk Grove Village, IL (US); Evgeny Kolev, Arlington Heights, IL (US); Gregory J. Lewis, Santa Cruz, CA (US); William Sheets, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 425 days.

(21) Appl. No.: 17/408,575

(22) Filed: Aug. 23, 2021

(65) Prior Publication Data

US 2022/0097034 A1    Mar. 31, 2022

Related U.S. Application Data

(60) Provisional application No. 63/085,819, filed on Sep. 30, 2020.

(51) Int. Cl.
| | |
|---|---|
| *B01J 39/09* | (2017.01) |
| *B01J 39/02* | (2006.01) |
| *C01B 33/20* | (2006.01) |

(52) U.S. Cl.
CPC ............ *B01J 39/09* (2017.01); *B01J 39/02* (2013.01); *C01B 33/20* (2013.01); *C01P 2002/72* (2013.01)

(58) Field of Classification Search
CPC . B01J 39/09; B01J 39/02; C01B 33/20; C01P 2002/72
See application file for complete search history.

(56) References Cited

U.S. PATENT DOCUMENTS

| | | | |
|---|---|---|---|
| 4,310,440 A | 1/1982 | Wilson et al. | |
| 4,853,202 A | 8/1989 | Kuznicki | |
| 5,888,472 A | 3/1999 | Bem et al. | |
| 6,379,641 B1 * | 4/2002 | Bedard | C01B 39/06 423/326 |
| 6,761,875 B2 | 7/2004 | Kuznicki et al. | |
| 10,449,526 B2 | 10/2019 | Lewis et al. | |

* cited by examiner

*Primary Examiner* — Colin W. Slifka
*Assistant Examiner* — Logan Edward Laclair
(74) *Attorney, Agent, or Firm* — Paschall & Associates, LLC; Mark Goldberg

(57) ABSTRACT

A new family of rare-earth silicate compositions and the synthetic methods used to prepare them. The materials have open-framework structures and are characterized by their ion-exchange properties. They are represented by the following empirical formula:

$$A^{r+}{}_p M^{s+}{}_{1-x} M'^{t+}{}_x Si_n O_m$$

where A is an exchangeable cation such as sodium, M is at least one element selected from the group of rare-earth elements, and M' is a framework metal having a valence of +2, +3, +4, or +5. The rare-earth silicate materials have utility in various cation-exchange applications such as dialysis and removal of toxic metals from the gastrointestinal tract.

12 Claims, No Drawings

RARE-EARTH SILICATE COMPOSITIONS AND THEIR PREPARATION

CROSS-REFERENCE TO RELATED APPLICATIONS

This application claims priority from U.S. Provisional Application No. 63/085,819, filed Sep. 30, 2020, which is incorporated herein in its entirety.

FIELD OF THE INVENTION

The present invention relates to a new family of rare-earth silicate compositions and the synthetic methods used to prepare them. The materials have open-framework structures and are characterized by their ion-exchange properties. They are represented by the following empirical formula:

$$A^{r+}_{p}M^{s+}_{1-x}M'^{t+}_{x}Si_{n}O_{m}$$

where A is an exchangeable cation such as sodium, M is at least one element selected from the group of rare-earth elements, and M' is a framework metal having a valence of +2, +3, +4, or +5. The rare-earth silicate materials have utility in various cation-exchange applications such as dialysis and removal of toxic metals from the gastrointestinal tract.

BACKGROUND OF THE INVENTION

Crystalline metallosilicates with microporous structures are used in a wide variety of industrial applications including catalysts for hydrocarbon conversion reactions and water purification. The most studied class of microporous metallosilicates are zeolites, which are open framework aluminosilicates with structures composed of corner-sharing $[SiO_{4/2}]$ and $[AlO_{4/2}]^{-}$ tetrahedra. Since aluminum is formally a trivalent cation ($Al^{3+}$), the $[AlO_{4/2}]^{-}$ units impart negative charge on the zeolite framework that require charge-balancing cations to maintain electroneutrality. Charge-balancing cations can be either inorganic, such as alkali metals, alkaline earth metals, amines, or organoammonium cations, and act as structure-directing agents during hydrothermal synthesis of metallosilicate compositions. In addition to defining the pores and interconnected channels of metallosilicate compositions, charge-balancing cations are readily replaced by alternate cations through ion exchange processes, which occurs without substantial displacement of framework atoms.

Since the pioneering work by Milton and coworkers in the 1950s there have been significant advances in the hydrothermal synthesis of zeolite compositions. These investigations led to the synthesis of numerous non-zeolitic microporous compositions. Wilson and coworkers synthesized pure microporous aluminophosphates (AlPOs) composed of corner-sharing $[AlO_{4/2}]^{-}$ and $[PO_{4/2}]^{+}$ tetrahedra in an alternating arrangement, where the positively charged $[PO_{4/2}]^{+}$ tetrahedra counterbalance the negatively charged $[AlO_{4/2}]^{-}$ to give a neutral framework (U.S. Pat. No. 4,310,440). In subsequent years, it was demonstrated that acidic sites can be introduced into these frameworks using aliovalent metal substitutions. For example, Stucky and coworkers demonstrated that approximately 30% of $Al^{3+}$ in $AlPO_{4}$-18 could be replaced with divalent $Co^{2+}$, yielding a negatively charged framework, although these methods relied on ethylene glycol (*Nature*, 1997, 388, 735-741). More recently, Lewis et al. reported a family of high charge density metallophosphate-based molecular sieves, which contain a combination of charge-balancing alkali and organoammonium cations in the pores. In each of these examples, the framework cations are located at the center of tetrahedral building units (U.S. Ser. No. 10/449,526).

Another class of microporous materials are metallosilicates that integrate corner-sharing $[SiO_{4/2}]$ tetrahedra and $[MO_{6/y}]^{2-}$ octahedral units. These materials often have formally tetravalent $M^{4+}$ metals ($Ti^{4+}$, $Zr^{4+}$, $Sn^{4+}$) at the center of octahedral building units. that can be corner-sharing, edge-sharing, or face-sharing. Kuznicki described a series of large-pored titanium silicates with open-framework structures that contain both corner-sharing $[SiO_{4/2}]$ tetrahedra and $[TiO_{6/2}]^{2-}$ octahedra that have significant ion-exchange capacity (U.S. Pat. No. 4,853,202). Another pertinent example of an open framework metallosilicate with both $[SiO_{4/2}]$ tetrahedra and $[MO_{6/2}]^{2-}$ octahedra are microporous zirconium silicate compositions described by Bem and coworkers (U.S. Pat. No. 5,888,472).

In each of these examples, the metal centers in the octahedral building units are formally tetravalent, while metallosilicate compositions that include $[MO_{6/2}]^{y-}$ octahedra with trivalent centers are far less common. The trivalent $M^{3+}$ metals give corner-sharing $[MO_{6/2}]^{3-}$ units a –3 charge, compared to $[TiO_{6/2}]^{2-}$ and $[ZrO_{6/2}]^{2-}$ octahedra that impart a –2 charge on the framework when in a corner-sharing motif. The additional charge in metallosilicates with trivalent $M^{3+}$ centers affords them greater charge density and modulated ion-exchange properties. In U.S. Pat. No. 6,379,641, a series of rare-earth silicate ion exchange compositions were disclosed that have relatively low silicon to rare-earth ratios not exceeding 5. Similarly, in U.S. Pat. No. 6,761,875 Kuznicki disclosed a rare-earth silicate composition with a silicon to rare-earth (cerium) ratio of approximately 4.5. Jeong et al. described a microporous cerium silicate with a silicon to rare-earth ratio of 6, but used tetravalent $Ce^{4+}$ in the study, not a trivalent rare-earth metal (*Chemical Communications*, 2002, 2398-2399). As will be shown in detail below, the rare-earth silicate ion exchange compositions synthesized and characterized by applicants have crystal structures that are different from those previously disclosed. Additionally, the ion exchange compositions disclosed herein have high silicon to rare-earth ratios exceeding 7, imparting the porous materials with modulated charge density and ion exchange properties. Furthermore, the rare-earth silicate materials disclosed herein are generated using a process where the rare-earth precursor is initially dissolved in a dilute acid solution, prior to adding the appropriate hydroxide. The disclosed process yields homogenous gels that are amenable to substitution and facilitate crystallization at 200° C., a low temperature for this class of materials.

SUMMARY OF THE INVENTION

Applicants have determined that microporous compositions identified as rare earth silicate ion exchange compositions have one of two novel frameworks, depending on the choice of the rare-earth cation, which is described in greater detail below. These ion exchangers are identified by their empirical formulas on an anhydrous basis of:

$$A^{r+}_{p}M^{s+}_{1-x}M'^{t+}_{x}Si_{n}O_{m}$$

where A is an exchangeable cation selected from the group consisting of alkali metals, alkaline earth metals, hydronium ion, ammonium ion, and mixtures thereof, "r" is the weighted average valence of A and varies from 1 to 2, "p" is the mole ratio of A to total metal (total metal=M+M') and varies from about 2 to about 5, M is at least one element selected from the group of rare-earth elements, "s" is the weighted average valence of M and varies from 3 to 4, "(1-x) is the mole fraction of total metal that is M and varies from 0.01 to 1, M' is a framework metal having a valence of +2, +3, +4, or +5, "t" is the weighted average valence of M' and varies from 2 to 5, "x" is the mole fraction of total metal that is M' and varies from 0 to 0.99, "n" is the mole ratio of Si to total metal and has a value of about 5 to about 10, and "m" is the mole ratio of O to total metal and is given by $$m = \frac{[(r \cdot p) + (s \cdot (1-x)) + (t \cdot x) + (4 \cdot n)]}{2}$$

When M is Ho, Er, Tm, Yb, Lu, Y or Sc, the material is characterized by the X-ray diffraction pattern having at least the d-spacings and relative intensities set forth in Table A:

TABLE A

| 2-Θ | d(Å) | I/I₀% |
|---|---|---|
| 6.85-6.60 | 12.89-13.39 | s-vs |
| 12.99-12.75 | 6.81-6.94 | m |
| 13.74-13.51 | 6.44-6.55 | m |
| 15.13-14.85 | 5.85-5.96 | w-m |
| 18.87-18.47 | 4.70-4.80 | w-m |
| 19.24-18.83 | 4.61-4.71 | w-m |
| 19.67-19.36 | 4.51-4.58 | w-m |
| 23.97-23.71 | 3.71-3.75 | w |
| 24.92-24.64 | 3.57-3.61 | w-m |
| 25.88-25.58 | 3.44-3.48 | w |
| 27.08-26.67 | 3.29-3.34 | w |
| 28.22-27.86 | 3.16-3.20 | w |
| 29.26-28.97 | 3.05-3.08 | w |
| 29.76-29.55 | 3.00-3.02 | w-m |
| 30.38-30.06 | 2.94-2.97 | w-m |
| 30.92-30.48 | 2.89-2.93 | w-s |
| 31.59-31.36 | 2.83-2.85 | w |
| 33.67-33.41 | 2.66-2.68 | w-m |
| 49.50-49.21 | 1.84-1.85 | w-m |
| 52.88-52.55 | 1.73-1.74 | w-m |

In another embodiment of the invention, M is La, Ce, Pr, Nd, Pm, Sm, Eu, Gd, or Dy, and the material is characterized by the X-ray diffraction pattern having at least the d-spacings and relative intensities set forth in Table B:

TABLE B

| 2-Θ | d(Å) | I/I₀% |
|---|---|---|
| 11.71-11.45 | 7.55-7.72 | m |
| 12.56-12.30 | 7.04-7.19 | w-m |
| 13.53-13.26 | 6.54-6.67 | m-vs |
| 13.83-13.59 | 6.40-6.51 | m-vs |
| 17.14-16.87 | 5.17-5.25 | m-vs |
| 21.03-20.79 | 4.22-4.27 | w-m |
| 21.39-21.14 | 4.15-4.20 | m |
| 23.39-23.21 | 3.80-3.83 | w-m |
| 24.78-24.57 | 3.59-3.62 | w-m |
| 26.59-26.35 | 3.35-3.38 | vs |
| 27.00-26.83 | 3.30-3.32 | w-s |
| 27.77-27.51 | 3.21-3.24 | m-vs |
| 28.04-27.86 | 3.18-3.20 | w-m |
| 28.49-28.31 | 3.13-3.15 | w-m |
| 29.86-29.66 | 2.99-3.01 | w-m |
| 34.60-34.06 | 2.59-2.63 | m |
| 35.31-34.88 | 2.54-2.57 | m |
| 36.34-36.04 | 2.47-2.49 | w-m |
| 39.67-38.61 | 2.27-2.33 | w |
| 45.31-44.83 | 2.00-2.02 | m |

In another embodiment of the invention, rare-earth metals that yield products described in Table A (Ho, Er, Tm, Yb, Lu, Y or Sc) can be mixed with rare-earth metals from Table B (La, Ce, Pr, Nd, Pm, Sm, Eu, Gd, or Dy). The process yields crystalline products with homogeneous distributions of the chosen rare-earth metals, and furthermore, is characterized by the X-ray diffraction pattern associated with the rare-earth metal that has a nominally higher concentration in the reaction gel. This and other objects and embodiments will become clear after the detailed description of the invention.

DETAILED DESCRIPTION OF THE INVENTION

As stated, the present invention relates to a new family of rare-earth silicate compositions. Accordingly, one embodiment of the invention is a crystalline open-framework material with an empirical composition in the as-synthesized form and on an anhydrous basis expressed by the empirical formula:

$$A^{r+}_p M^{s+}_{1-x} M'^{t+}_x Si_n O_m$$

In this formula "A" is a structure-directing cation that also serves as a counterbalancing cation and is selected from the group consisting of alkali metals, alkaline earth metals, hydronium ion, ammonium ion, quaternary ammonium ion, and mixtures thereof. Specific examples of alkali metals include, but are not limited to, sodium, potassium and mixtures thereof. Examples of alkaline earth metals include, but are not limited to, magnesium and calcium. "r" is the weighted average valence of A and varies from 1 to 2. The value of "p", which is the mole ratio of "A" to total metal (total metal=M+M') varies from about 2 to about 5. The framework structure is composed of silicon, at least one rare-earth element (M) and optionally an M' metal. The total metal is defined as M+M', where the mole fraction of total metal that is rare earth metals M is given by 1-x while the mole fraction of total metal that is M' metals is given by "x." The rare-earth elements that are represented by M have a valence of +3 or +4, and include scandium, yttrium, lanthanum, cerium, praseodymium, neodymium, promethium, samarium, europium, gadolinium, terbium, dysprosium, holmium, erbium, thulium, ytterbium, and lutetium. In accordance with these options for M, "s", the weighted average valence of M, varies from 3 to 4. Similarly, more than one M' metal can be present and each M' metal can have a different valence. The M' metals that can be substituted into the framework have a valence of +2, +3, +4, or +5. Examples of these metals include, but are not limited to, zinc (+2), iron (+3), titanium (+4), zirconium (+4), and niobium (+5). Hence, "t", the weighted average valence of M' varies from 2 to 5. Lastly, "n" is the mole ratio of Si to total metal and has a value of about 5 to 10, and "m" is the ratio of O to total metal and is given by $$m = \frac{[(r \cdot p) + (s \cdot (1-x)) + (t \cdot x) + (4 \cdot n)]}{2}$$

When only one type of A cation is present, then the weighted average valence is just the valence of that cation, e.g., +1 or +2. When more than one A cation is present, the total amount of A is given by the equation:

$$A^{r+}_p = A^{(r1)+}_{p1} + A^{(r2)+}_{p2} + A^{(r3)+}_{p3} + \ldots$$

the weighted average valence "r" is given by:

$$r = \frac{(r1 \cdot p1) + (r2 \cdot p2) + (r3 \cdot p3) + \cdots}{p1 + p2 + p3 + \cdots}$$

Similarly, when only one type of rare earth metal M is present, then the weighted average valence is just the valence of that metal, e.g., +3 or +4. When more than one M metal is present, the total amount of M, for simplicity using the variable y for 1−x, i.e., y=1−x, is given by the equation:

$$M_{1-x}{}^{s+} = M_{y}{}^{s+} = M_{y1}{}^{(s1)+} + M_{y2}{}^{(s2)+} + M_{y3}{}^{(s3)+} + \ldots$$

the weighted average valence "s" is given by:

$$s = \frac{(s1 \cdot y1) + (s2 \cdot y2) + (s3 \cdot y3) + \cdots}{y1 + y2 + y3 + \cdots}$$

Similarly, when only one type of M' metal is present, then the weighted average valence is just the valence of that metal, e.g., +2, +3, +4 or +5. When more than one M metal is present, the total amount of M is given by the equation:

$$M'_{x}{}^{t+} = M'_{x1}{}^{(t1)+} + M'_{x2}{}^{(t2)+} + M'_{x3}{}^{(t3)+} + \ldots$$

the weighted average valence "t" is given by:

$$t = \frac{(t1 \cdot x1) + (t2 \cdot x2) + (t3 \cdot x3) + \cdots}{x1 + x2 + x3 + \cdots}$$

The composition has a framework structure that is composed of $SiO_{4/2}$ tetrahedral oxide units, at least one rare-earth metal oxide unit, and optionally an M' metal oxide unit. Furthermore, the rare-earth metals are 6, 7, or 8 coordinate and the M' metals are 4, 5, or 6 coordinate.

The rare-earth silicates described herein are prepared through hydrothermal crystallization of a reaction mixture prepared by combining reactive sources of silicon, rare-earth metal (M), optionally an M' metal, at least one cation (A), and water. Silicon sources include, but are not limited to, colloidal silica, fumed silica, tetraorthosilicate and sodium silicate. Sources of the rare-earth metals (M) include, but are not limited to, metal halides, metal nitrates, metal acetates, metal sulfates, metal oxides, metal hydrous oxides and mixtures thereof. Specific examples of rare-earth metal (M) precursors include, but are not limited to, cerium (III) sulfate, cerium (IV) sulfate, yttrium chloride, ytterbium oxide, ytterbium nitrate, ytterbium sulfate octahydrate, ytterbium carbonate, and ytterbium oxalate. Sources of M' metals include, but are not limited to, metal halides, metal nitrates, metal acetates, metal oxides, metal hydrous oxide, metal alkoxides, and mixtures thereof. Specific examples include, but are not limited to, zinc chloride, zirconium butoxide, titanium (IV) chloride, titanium (III) chloride solution, niobium (V) chloride, and niobium (V) oxide. Alkali sources include, but are not limited to, sodium hydroxide, potassium hydroxide, rubidium hydroxide, cesium hydroxide, sodium carbonate, potassium carbonate, rubidium carbonate, cesium carbonate, sodium halide, potassium halide, rubidium halide, and cesium halide.

Generally, the hydrothermal process used to prepare the rare-earth silicate ion exchange compositions used in this invention involves forming a reaction mixture containing reactive sources of the required components, which in terms of molar ratios of the oxides is expressed by the following formula:

$$aA_{2/m}O:1-bMO_{h/2}:bM'O_{g/2}:cSiO_2:dH_2O$$

where "a" has a value from about 1 to about 100, "m" is the valence of the A components and has values of +1 or +2, "b" has a value from zero to less than 1.0, "h" is the valence of the M components and has values of +3 or +4, "g" is the valence of the M' components and has values of +2, +3, +4, or +5, "c" has a value of about 0.5 to about 150, and "d" has a value from about 30 to about 10000.

The reaction mixture is prepared by mixing the appropriate sources of rare-earth metal, silicon, alkali or alkaline earth templating cation, and optionally an M' element in any order to give the desired mixture. The basicity of the mixture is controlled by adding alkali hydroxide, quaternary ammonium hydroxide, and/or basic compounds to the other constituents of the mixture. The reaction mixture is then reacted at a temperature of about 100° C. to 300° C. for a period of 1 hour to about 30 days in a sealed reaction vessel under autogenous pressure. After the reaction is complete, the resulting mixture is filtered or centrifuged to isolate the solid product, which is washed with deionized water and dried in air or in an oven up to 100° C. As stated, the compositions of this invention have framework structure of tetrahedral $SiO_2$ units, at least one rare-earth metal oxide unit, and optionally an M' metal oxide unit. This framework often results in a microporous structure having an intracrystalline pore system with uniform pore diameters that vary considerably from about 2.5 Å to about 15 Å. On the other hand, the framework of the composition may be layered or amorphous.

As synthesized, the compositions of this invention will contain some of the alkali metal templating agent in the pores, between layers or in other charge balancing positions. These metals are described as exchangeable cations, meaning that they can be exchanged with other (secondary) A' cations. Generally, the A exchangeable cations can be exchanged with A' cations selected from other alkali metal cations ($K^+$, $Na^+$, $Rb^+$, $Cs^+$), alkaline earth cations ($Mg^{2+}$, $Ca^{2+}$, $Sr^{2+}$, $Ba^{2+}$), hydronium ion, transition metal cations of valence 2+ or 3+, rare earth cations or mixtures thereof. It is understood that the A' cation is different from the A cation. The methods used to exchange one cation for another are well known in the art and involve contacting the compositions with a solution containing the desired cation (at molar excess) at exchange conditions. Exchange conditions include a temperature of about 25° C. to about 100° C. and a time of about 20 minutes to about 2 hours. The particular cation (or mixture thereof), which is present in the final product will depend on the particular use of the composition and the specific composition being used. One specific composition is an ion exchanger where the A' cation is a mixture of $Na^+$, $Ca^{2+}$ and $H^+$ ions.

In certain instances, when a quaternary ammonium cation is used in the synthesis, usually as a hydroxide source, the quaternary ammonium cation may be incorporated into the product. Usually, this will not be the case because the quaternary ammonium cations will often be displaced by the alkali cations that have a higher affinity for incorporation into the product. However, the quaternary ammonium ion must be removed from the product. This can often be accomplished by the ion exchange processes mentioned in the previous paragraph. Sometimes the quaternary ammonium ion may be trapped in a pore and it may not be possible to remove the quaternary ammonium cation by ion exchange, in which case a calcination will be required.

Typically, the calcination consists of heating the sample to a temperature of 500-600° C. for 2-24 hours in flowing air or in flowing nitrogen followed by flowing air. In this process the quaternary ammonium cation is decomposed and replaced by a residual proton. Once the calcination is completed, the sample can be ion exchanged to the desired A' cation composition, as described above.

The disclosed compositions have particular utility in adsorbing the metal toxins $Pb^{2+}$ and $Hg^{2+}$ from fluids selected from bodily fluids, dialysate solutions, and mixtures thereof. As used herein and in the claims, bodily fluids will include but not be limited to blood, blood plasma and gastrointestinal fluids. Also, the compositions are meant to be used to treat bodily fluids of any mammalian body, including but not limited to humans, cows, pigs, sheep, monkeys, gorillas, horses, dogs, etc. The instant process is particularly suited for removing toxins from a human body. The rare-earth silicate ion exchangers can also be formed into pills or other shapes that can be ingested orally and which pick up toxins in the gastrointestinal fluid as the ion exchanger passes through the intestines and is finally excreted. In order to protect the ion exchangers from the high acid content in the stomach, the shaped articles may be coated with various coatings which will not dissolve in the stomach, but dissolve in the intestines.

As has also been stated, although the instant compositions are synthesized with a variety of exchangeable cations ("A"), it is preferred to exchange the cation with secondary cations (A') which are more compatible with blood or do not adversely affect the blood. For this reason, preferred cations are sodium, calcium, hydronium and magnesium. Preferred compositions are those containing sodium and calcium or sodium, calcium and hydronium ions. The relative amount of sodium and calcium can vary considerably and depends on the composition and the concentration of these ions in the blood.

The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer-based techniques. Flat compressed powder samples were continuously scanned at 2° to 70° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In the x-ray patterns reported, the relative intensities of the d-spacings are indicated by the notations vs, s, m, and w which represent very strong, strong, medium, and weak, respectively. In terms of 100× $I/I_o$, the above designations are defined as:

$w>0-15$; $m>15-60$; $s>60-80$ and $vs>80-100$

In certain instances, the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the instant invention, the following examples are set forth. It is to be understood that the examples are only by way of illustration and are not intended as an undue limitation on the broad scope of the invention as set forth in the appended claims.

EXAMPLES

Example 1: Sodium Ytterbium Silicate

In a 250 mL beaker equipped with a high-speed overhead mixer, 9.71 g NaOH pellets (98%) was dissolved in 25.00 g of deionized water. To this solution, 20.25 g colloidal silica (Ludox AS-40, 40% $SiO_2$) was added and stirred vigorously for 60 minutes. Separately, 5.25 g $YbCl_3 \cdot 6H_2O$ (99.9%) was dissolved in 125.00 g deionized water that contained 3.75 g concentrated $H_2SO_4$, yielding a clear solution. The solution containing the digested $SiO_2$ was then added dropwise to the $YbCl_3 \cdot 6H_2O$ solution while stirring vigorously using an overhead stirrer at 400 RPM, yielding a homogenous white reaction mixture. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

Chemical analysis of the product gave an empirical formula of $Na_{3.72}YbSi_{7.78}O_{18.93}$, and its powder X-ray diffraction pattern was characterized by the representative diffraction lines presented in Table 1.

TABLE 1

| 2-Θ | d(Å) | $I/I_o\%$ |
|---|---|---|
| 6.68 | 13.22 | vs |
| 12.88 | 6.87 | m |
| 13.09 | 6.76 | m |
| 13.64 | 6.49 | m |
| 14.99 | 5.91 | m |
| 18.75 | 4.73 | m |
| 19.08 | 4.65 | w |
| 19.27 | 4.60 | m |
| 19.51 | 4.55 | w |
| 21.05 | 4.22 | w |
| 22.09 | 4.02 | w |
| 23.85 | 3.73 | w |
| 24.81 | 3.59 | m |
| 25.79 | 3.45 | m |
| 26.36 | 3.38 | w |
| 26.85 | 3.32 | w |
| 28.06 | 3.18 | w |
| 28.54 | 3.13 | w |
| 29.11 | 3.07 | w |
| 29.73 | 3.00 | m |
| 30.23 | 2.95 | m |
| 30.78 | 2.90 | m |
| 31.15 | 2.87 | w |
| 31.53 | 2.84 | w |
| 33.57 | 2.67 | m |
| 34.58 | 2.59 | w |
| 49.33 | 1.85 | w |
| 52.64 | 1.74 | w |

Example 2: Sodium Yttrium Silicate

In a 250 mL beaker equipped with a high-speed overhead mixer, 4.85 g NaOH pellets (98%) was dissolved in 12.50 g of deionized water. To this solution, 10.13 g colloidal silica (Ludox AS-40, 40% $SiO_2$) was added and stirred vigorously for 60 minutes. Separately, 2.59 g $Y(NO_3)_3 \cdot 6H_2O$ (99.9%) was dissolved in 62.50 g deionized water that contained 1.88 g concentrated $H_2SO_4$, yielding a clear solution. The solution containing the digested $SiO_2$ was then added dropwise to the $Y(NO_3)_3 \cdot 6H_2O$ solution while stirring vigorously using an overhead stirrer at 400RPM, yielding a homogenous white reaction mixture. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

Chemical analysis of the product gave an empirical formula of $Na_{3.66}YSi_{7.83}O_{18.99}$, and its powder X-ray diffraction pattern is characterized by representative diffraction lines listed in Table 2.

TABLE 2

| 2-Θ | d(Å) | I/I₀% |
|---|---|---|
| 6.69 | 13.21 | vs |
| 12.86 | 6.88 | m |
| 13.09 | 6.76 | m |
| 13.61 | 6.50 | m |
| 14.99 | 5.91 | m |
| 15.20 | 5.82 | w |
| 18.64 | 4.76 | m |
| 19.03 | 4.66 | m |
| 19.25 | 4.61 | m |
| 19.47 | 4.55 | m |
| 21.00 | 4.23 | w |
| 22.06 | 4.03 | w |
| 23.83 | 3.73 | w |
| 24.76 | 3.59 | m |
| 25.74 | 3.46 | w |
| 26.84 | 3.32 | w |
| 28.06 | 3.18 | w |
| 29.11 | 3.07 | w |
| 29.68 | 3.01 | m |
| 30.22 | 2.96 | m |
| 30.68 | 2.91 | m |
| 31.04 | 2.88 | m |
| 31.48 | 2.84 | w |
| 33.54 | 2.67 | m |
| 34.48 | 2.60 | w |
| 34.96 | 2.56 | w |
| 49.31 | 1.85 | w |
| 50.08 | 1.82 | w |
| 52.61 | 1.74 | m |

Example 3: Sodium Erbium Silicate

In a 250 mL beaker equipped with a high-speed overhead mixer, 5.80 g NaOH pellets (98%) was dissolved in 18.07 g of deionized water. To this solution, 12.16 g colloidal silica (Ludox AS-40, 40% $SiO_2$) was added and stirred vigorously for 60 minutes. Separately, 3.10 g $ErCl_3 \cdot 6H_2O$ (99.9%) was dissolved in 78.02 g deionized water that contained 2.25 g concentrated $H_2SO_4$, yielding a clear solution with a slight red hue. The solution containing the digested $SiO_2$ was then added dropwise to the $ErCl_3 \cdot 6H_2O$ solution while stirring vigorously using an overhead stirrer at 400RPM, yielding a homogenous reaction mixture with slight red hue. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

Chemical analysis of the product gave an empirical formula of $Na_{3.71}ErSi_{8.02}O_{21.90}$, and its powder X-ray diffraction pattern is characterized by the representative diffraction lines listed in Table 3.

TABLE 3

| 2-Θ | d(Å) | I/I₀% |
|---|---|---|
| 6.76 | 13.06 | vs |
| 12.82 | 6.90 | m |
| 13.15 | 6.73 | m |
| 13.63 | 6.49 | m |
| 14.14 | 6.26 | w |
| 15.00 | 5.90 | m |
| 18.61 | 4.76 | m |
| 19.00 | 4.67 | m |
| 19.49 | 4.55 | m |
| 19.90 | 4.46 | w |
| 23.85 | 3.73 | w |
| 24.80 | 3.59 | m |
| 25.70 | 3.46 | w |
| 26.88 | 3.31 | w |
| 28.02 | 3.18 | w |
| 29.11 | 3.07 | w |
| 29.67 | 3.01 | m |
| 30.21 | 2.96 | m |
| 30.64 | 2.92 | m |
| 31.16 | 2.87 | w |
| 31.51 | 2.84 | w |
| 33.51 | 2.67 | m |
| 49.23 | 1.85 | m |
| 49.95 | 1.82 | w |
| 52.60 | 1.74 | w |

Example 4: Sodium Ytterbium/Gadolinium Silicate

In a 250 mL beaker equipped with a high-speed overhead mixer, 9.71 g NaOH pellets (98%) was dissolved in 30.0 g of deionized water. To this solution, 20.25 g colloidal silica (Ludox AS-40, 40% $SiO_2$) was added and stirred vigorously for 60 minutes. Separately, 2.63 g $YbCl_3 \cdot 6H_2O$ (99.9%) and 2.61 g of $YbCl_3 \cdot 6H_2O$ (99.9%) was dissolved in 120.0 g deionized water that contained 3.75 g concentrated $H_2SO_4$, yielding a clear solution. The solution containing the digested $SiO_2$ was then added dropwise to the $ErCl_3$—$GdCl_3$ solution while stirring vigorously using an overhead stirrer at 400RPM, yielding a homogenous white reaction mixture. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

Chemical analysis of the product gave an empirical formula of $Na_{3.72}Yb_{0.49}Gd_{0.51}Si_{7.08}O_{21.90}$, and its powder X-ray diffraction pattern is characterized by the representative diffraction lines listed in Table 4.

TABLE 4

| 2-Θ | d(Å) | I/I₀% |
|---|---|---|
| 6.72 | 13.15 | vs |
| 12.90 | 6.86 | m |
| 13.62 | 6.49 | m |
| 14.97 | 5.91 | m |
| 18.73 | 4.74 | m |
| 19.04 | 4.66 | w |
| 19.30 | 4.59 | w |
| 19.54 | 4.54 | w |
| 21.04 | 4.22 | w |
| 22.11 | 4.02 | w |
| 23.84 | 3.73 | w |
| 24.80 | 3.59 | m |
| 25.76 | 3.46 | w |
| 26.37 | 3.38 | w |
| 26.85 | 3.32 | w |
| 28.02 | 3.18 | w |
| 28.54 | 3.13 | w |
| 29.11 | 3.07 | w |
| 29.68 | 3.01 | w |
| 30.21 | 2.96 | m |
| 30.66 | 2.91 | m |
| 31.11 | 2.87 | w |
| 31.49 | 2.84 | w |
| 33.56 | 2.67 | m |
| 34.55 | 2.59 | w |
| 49.29 | 1.85 | w |
| 52.60 | 1.74 | w |

Example 5: K⁺-Exchanged Yttrium Silicate

The product described in the following example was synthesized by ion-exchange of Example 2 to yield the potassium form. 2 g of the product described in Example 2 was dispersed in 100 mL of deionized water followed by the addition of 200 mL of 2M KCl solution. The mixture was stirred at 50° C. for 2 hours followed by cooling. The resulting solid was collected by centrifugation and the process was repeated two more times. The final product was washed three times and dried overnight at 100° C.

Chemical analysis of the product gave an empirical formula of $K_{2.65}YSi_{5.72}O_{14.27}$, and its powder X-ray diffraction pattern is characterized by the representative diffraction lines listed in Table 5.

TABLE 5

| 2-Θ | d(Å) | I/I₀% |
|---|---|---|
| 6.92 | 12.76 | s |
| 12.79 | 6.91 | m |
| 13.65 | 6.48 | m |
| 14.67 | 6.04 | m |
| 18.83 | 4.71 | m |
| 20.15 | 4.40 | m |
| 24.00 | 3.71 | m |
| 25.72 | 3.46 | m |
| 29.33 | 3.04 | s |
| 30.30 | 2.95 | s |
| 31.25 | 2.86 | m |
| 31.99 | 2.80 | w |
| 32.80 | 2.73 | m |
| 49.40 | 1.84 | m |
| 52.48 | 1.74 | w |

Example 6: Tin-Doped Sodium Ytterbium Silicate

A tin-doped version of Example 1 was prepared as follows. In a 250 mL beaker equipped with a high-speed overhead mixer, 6.45 g NaOH pellets (98%) was dissolved in 20.13 g of deionized water. To this solution, 13.49 g colloidal silica (Ludox AS-40, 40% SiO₂) was added and stirred vigorously for 60 minutes. Separately, 3.19 g YbCl₃-6H₂O (99.9%) was dissolved in 80.10 g deionized water that contained 2.43 g concentrated H₂SO₄, yielding a clear solution. The solution containing the digested SiO₂ was then added dropwise to the YbCl₃-6H₂O solution while stirring vigorously using an overhead stirrer at 400RPM, yielding a homogenous white reaction mixture. After stirring for 1 hour, 0.18 g SnCl₄-5H₂O was added and the reaction solution was stirred for an additional 1 hour. The resulting reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

Analysis of the product using a scanning electron microscope equipped with energy dispersive X-ray spectroscopy showed a homogeneous distribution of Sn in material. Chemical analysis of the product gave an empirical formula of $Na_{5.00}Yb_{0.73}Sn_{0.27}Si_{7.68}O_{19.50}$, and its powder X-ray diffraction pattern is characterized by the representative diffraction lines listed in Table 6.

TABLE 6

| 2-Θ | d(Å) | I/I₀% |
|---|---|---|
| 6.99 | 12.64 | vs |
| 13.06 | 6.78 | s |
| 13.90 | 6.37 | m |
| 15.17 | 5.84 | m |
| 15.52 | 5.71 | m |
| 19.09 | 4.64 | m |
| 19.46 | 4.56 | m |
| 20.05 | 4.42 | w |
| 22.41 | 3.97 | m |
| 25.11 | 3.54 | m |
| 26.06 | 3.42 | m |
| 28.41 | 3.14 | w |
| 30.18 | 2.96 | m |
| 30.62 | 2.92 | vs |
| 30.95 | 2.89 | vs |
| 31.59 | 2.83 | m |
| 32.19 | 2.78 | w |
| 33.88 | 2.64 | w |
| 50.06 | 1.82 | w |
| 52.98 | 1.73 | w |

Example 7: Sodium Lanthanum Silicate

In a 250 mL beaker equipped with a high-speed overhead mixer, 4.85 g NaOH pellets (98%) was dissolved in 15.0 g of deionized water. To this solution, 10.13 g colloidal silica (Ludox AS-40, 40% SiO₂) was added and stirred vigorously for 60 minutes. Separately, 2.93 g La(NO₃)₃-6H₂O (99.9%) was dissolved in 60.0 g deionized water that contained 1.88 g concentrated H₂SO₄, yielding a clear solution. The solution containing the digested SiO₂ was then added dropwise to the La(NO₃)₃-6H₂O solution while stirring vigorously using an overhead stirrer at 400RPM, yielding a homogenous white reaction mixture. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

The powder X-ray diffraction pattern of the product is characterized by representative diffraction lines shown in Table 7.

TABLE 7

| 2-Θ | d(Å) | I/I$_0$% |
|---|---|---|
| 11.56 | 7.65 | m |
| 12.40 | 7.13 | m |
| 13.35 | 6.63 | vs |
| 13.67 | 6.47 | m |
| 16.99 | 5.22 | s |
| 18.29 | 4.85 | w |
| 20.88 | 4.25 | m |
| 21.23 | 4.18 | m |
| 23.26 | 3.82 | m |
| 24.64 | 3.61 | m |
| 26.44 | 3.37 | vs |
| 26.89 | 3.31 | s |
| 27.59 | 3.23 | s |
| 27.91 | 3.19 | m |
| 28.39 | 3.14 | m |
| 29.73 | 3.00 | m |
| 32.54 | 2.75 | w |
| 33.83 | 2.65 | m |
| 34.23 | 2.62 | m |
| 34.34 | 2.61 | m |
| 35.04 | 2.56 | m |
| 35.20 | 2.55 | w |
| 36.15 | 2.48 | m |
| 37.04 | 2.43 | w |
| 38.75 | 2.32 | w |
| 39.70 | 2.27 | w |
| 42.46 | 2.13 | w |
| 43.71 | 2.07 | m |
| 45.11 | 2.01 | m |

Example 8: Sodium Neodymium Silicate

In a 250 mL beaker equipped with a high-speed overhead mixer, 10.35 g NaOH pellets (98%) was dissolved in 35.00 g of deionized water. To this solution, 21.60 g colloidal silica (Ludox AS-40, 40% SiO$_2$) was added and stirred vigorously for 60 minutes. Separately, 5.20 g NdCl$_3$-6H$_2$O (99.9%) was dissolved in 125.00 g deionized water that contained 4.00 g concentrated H$_2$SO$_4$, yielding a clear solution with a blue hue. The solution containing the digested SiO$_2$ was then added dropwise to the NdCl$_3$-6H$_2$O solution while stirring vigorously using an overhead stirrer at 400RPM, yielding a homogenous white reaction mixture. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

Chemical analysis of the product gave an empirical formula of Na$_{3.04}$NdSi$_{6.13}$O$_{15.28}$, and characterization by powder X-ray diffraction yielded the representative diffraction lines presented in Table 8.

TABLE 8

| 2-Θ | d(Å) | I/I$_0$% |
|---|---|---|
| 11.61 | 7.61 | m |
| 12.46 | 7.10 | w |
| 13.44 | 6.58 | m |

TABLE 8-continued

| 2-Θ | d(Å) | I/I$_0$% |
|---|---|---|
| 13.75 | 6.44 | w |
| 17.04 | 5.20 | m |
| 18.35 | 4.83 | w |
| 20.95 | 4.24 | w |
| 21.28 | 4.17 | m |
| 23.29 | 3.82 | m |
| 24.70 | 3.60 | w |
| 26.46 | 3.37 | vs |
| 26.94 | 3.31 | w |
| 27.60 | 3.23 | m |
| 27.95 | 3.19 | w |
| 28.41 | 3.14 | w |
| 29.76 | 3.00 | w |
| 31.83 | 2.81 | m |
| 34.21 | 2.62 | m |
| 35.20 | 2.55 | m |
| 36.16 | 2.48 | w |
| 38.71 | 2.32 | w |
| 39.66 | 2.27 | w |
| 42.46 | 2.13 | w |
| 45.06 | 2.01 | m |
| 47.47 | 1.91 | m |
| 47.54 | 1.91 | m |
| 50.44 | 1.81 | w |
| 54.03 | 1.70 | w |
| 55.52 | 1.65 | w |

Example 9: Sodium Samarium Silicate

In a 250 mL beaker equipped with a high-speed overhead mixer, 4.85 g NaOH pellets (98%) was dissolved in 25.0 g of deionized water. To this solution, 10.13 g colloidal silica (Ludox AS-40, 40% SiO$_2$) was added and stirred vigorously for 60 minutes. Separately, 2.48 g SmCl$_3$-6H$_2$O (99.9%) was dissolved in 50.0 g deionized water that contained 1.88 g concentrated H$_2$SO$_4$, yielding a clear solution. The solution containing the digested SiO$_2$ was then added dropwise to the NdCl$_3$-6H$_2$O solution while stirring vigorously using an overhead stirrer at 400RPM, yielding a homogenous white reaction mixture. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

The product is characterized by the powder X-ray diffraction, representative diffraction lines are shown in Table 8.

TABLE 9

| 2-Θ | d(Å) | I/I$_0$% |
|---|---|---|
| 11.58 | 7.63 | m |
| 12.41 | 7.13 | m |
| 13.37 | 6.62 | m |
| 13.70 | 6.46 | m |
| 17.01 | 5.21 | m |
| 18.29 | 4.85 | w |
| 20.90 | 4.25 | w |
| 21.25 | 4.18 | m |
| 23.29 | 3.82 | w |
| 24.67 | 3.61 | w |
| 26.48 | 3.36 | vs |
| 26.91 | 3.31 | m |
| 27.61 | 3.23 | m |
| 27.92 | 3.19 | m |
| 28.42 | 3.14 | m |

TABLE 9-continued

| 2-Θ | d(Å) | I/I₀% |
|---|---|---|
| 29.73 | 3.00 | w |
| 31.85 | 2.81 | w |
| 32.56 | 2.75 | w |
| 33.84 | 2.65 | w |
| 34.34 | 2.61 | m |
| 35.09 | 2.56 | m |
| 36.16 | 2.48 | w |
| 37.06 | 2.42 | w |
| 38.82 | 2.32 | w |
| 39.72 | 2.27 | w |
| 42.50 | 2.13 | w |
| 45.13 | 2.01 | m |

Example 10: Sodium Gadolinium Silicate

In a 250 mL beaker equipped with a high-speed overhead mixer, 4.87 g NaOH pellets (98%) was dissolved in 25.0 g of deionized water. To this solution, 10.09 g colloidal silica (Ludox AS-40, 40% SiO₂) was added and stirred vigorously for 60 minutes. Separately, 2.51 g GdCl₃·6H₂O (99.9%) was dissolved in 50.0 g deionized water that contained 1.87 g concentrated H₂SO₄, yielding a clear solution. The solution containing the digested SiO₂ was then added dropwise to the GdCl₃·6H₂O solution while stirring vigorously using an overhead stirrer at 400RPM, yielding a homogenous white reaction mixture. After stirring for 30 minutes, the reaction mixture was then transferred into 45 cc autoclaves and digested at 200° C. for four days quiescently at autogenous pressure. After cooling to room temperature, the product was isolated via centrifugation. The sample was then re-dispersed in deionized water and then centrifuged again, and this process was repeated two times. The final product was then dried at 100° C. overnight.

The product is characterized by the powder X-ray diffraction, representative diffraction lines are shown in Table 10.

TABLE 10

| 2-Θ | d(Å) | I/I₀% |
|---|---|---|
| 11.57 | 7.65 | m |
| 12.41 | 7.13 | m |
| 13.39 | 6.61 | m |
| 13.70 | 6.46 | vs |
| 17.01 | 5.21 | vs |
| 20.92 | 4.24 | m |
| 21.28 | 4.17 | m |
| 23.34 | 3.81 | m |
| 24.70 | 3.60 | m |
| 26.51 | 3.36 | vs |
| 26.94 | 3.31 | m |
| 27.64 | 3.22 | vs |
| 27.93 | 3.19 | m |
| 28.44 | 3.14 | m |
| 29.77 | 3.00 | w |
| 31.90 | 2.80 | w |
| 32.60 | 2.74 | w |
| 34.42 | 2.60 | m |
| 35.12 | 2.55 | m |
| 36.23 | 2.48 | w |
| 37.11 | 2.42 | w |
| 38.85 | 2.32 | w |
| 39.77 | 2.26 | m |
| 42.55 | 2.12 | w |
| 43.81 | 2.06 | m |
| 45.22 | 2.00 | m |
| 45.31 | 2.00 | m |

Specific Embodiments

While the following is described in conjunction with specific embodiments, it will be understood that this description is intended to illustrate and not limit the scope of the preceding description and the appended claims.

A first embodiment of the invention is an open framework microporous rare-earth silicate ion exchange composition comprised of $[SiO_{4/2}]$ tetrahedra, $[MO_{6/y}]^{z-}$ octahedra, and $[M'O_{6/y}]^{z-}$ octahedral units having one of two novel frameworks, depending on the choice of the rare-earth cation, identified by their empirical formulas on an anhydrous basis of $A^{r+}_p M^{s+}_{1-x} M'^{t+}_x Si_n O_m$ where A is an exchangeable cation selected from the group consisting of alkali metals, alkaline earth metals, hydronium ion, ammonium ion, and mixtures thereof, "r" is the weighted average valence of A and varies from 1 to 2, "p" is the mole ratio of A to total metal (total metal=M+M') and varies from about 2 to about 5, M is at least one element selected from the group of rare-earth elements, "s" is the weighted average valence of M and varies from 3 to 4, "(1-x)" is the mole fraction of total metal that is M and varies from 0.01 to 1, M' is a framework metal having a valence of +2, +3, +4, or +5, "t" is the weighted average valence of M' and varies from 2 to 5, "x" is the mole fraction of total metal that is M' and varies from 0 to 0.99, "n" is the mole ratio of Si to total metal and has a value of about 5 to about 10, and "m" is the mole ratio of O to total metal and is given by $$m = \frac{[(r \cdot p) + (s \cdot (1 - x)) + (t \cdot x) + (4 \cdot n)]}{2}$$

and when M is Ho, Er, Tm, Yb, Lu, Y or Sc, the material is characterized by the X-ray diffraction pattern having at least the d-spacings and relative intensities set forth in Table A

TABLE A

| 2-Θ | d(Å) | I/I₀ % |
|---|---|---|
| 6.85-6.60 | 12.89-13.39 | vs |
| 12.99-12.75 | 6.81-6.94 | m |
| 13.74-13.51 | 6.44-6.55 | m |
| 15.13-14.85 | 5.85-5.96 | w-m |
| 18.87-18.47 | 4.70-4.80 | w-m |
| 19.24-18.83 | 4.61-4.71 | w-m |
| 19.67-19.36 | 4.51-4.58 | w-m |
| 23.97-23.71 | 3.71-3.75 | w |
| 24.92-24.64 | 3.57-3.61 | w-m |
| 25.88-25.58 | 3.44-3.48 | w |
| 27.08-26.67 | 3.29-3.34 | w |
| 28.22-27.86 | 3.16-3.20 | w |
| 29.26-28.97 | 3.05-3.08 | w |
| 29.76-29.55 | 3.00-3.02 | w-m |
| 30.38-30.06 | 2.94-2.97 | w-m |
| 30.92-30.48 | 2.89-2.93 | w-s |
| 31.59-31.36 | 2.83-2.85 | w |
| 33.67-33.41 | 2.66-2.68 | w-m |
| 49.50-49.21 | 1.84-1.85 | w-m |
| 52.88-52.55 | 1.73-1.74 | w-m | and when M is La, Ce, Pr, Nd, Pm, Sm, Eu, Gd, or Dy, and the material is characterized by the X-ray diffraction pattern having at least the d-spacings and relative intensities set forth in Table B

TABLE B

| 2-Θ | d(Å) | I/I₀ % |
|---|---|---|
| 11.71-11.45 | 7.55-7.72 | m |
| 12.56-12.30 | 7.04-7.19 | w-m |
| 13.53-13.26 | 6.54-6.67 | m-vs |
| 13.83-13.59 | 6.40-6.51 | m-vs |
| 17.14-16.87 | 5.17-5.25 | m-vs |
| 21.03-20.79 | 4.22-4.27 | w-m |
| 21.39-21.14 | 4.15-4.20 | m |
| 23.39-23.21 | 3.80-3.83 | w-m |
| 24.78-24.57 | 3.59-3.62 | w-m |
| 26.59-26.35 | 3.35-3.38 | vs |
| 27.00-26.83 | 3.30-3.32 | w-s |
| 27.77-27.51 | 3.21-3.24 | m-vs |
| 28.04-27.86 | 3.18-3.20 | w-m |
| 28.49-28.31 | 3.13-3.15 | w-m |
| 29.86-29.66 | 2.99-3.01 | w-m |
| 34.60-34.06 | 2.59-2.63 | m |
| 35.31-34.88 | 2.54-2.57 | m |
| 36.34-36.04 | 2.47-2.49 | w-m |
| 39.67-38.61 | 2.27-2.33 | w |
| 45.31-44.83 | 2.00-2.02 | m |

An embodiment of the invention is one, any or all of prior embodiments in this paragraph up through the first embodiment in this paragraph where M is Ho, Er, Tm, Yb, Lu, Y, or Sc, or mixtures thereof, and the material is characterized by the X-ray diffraction pattern having at least the d-spacings and relative intensities set forth in Table A

TABLE A

| 2-Θ | d(Å) | I/I₀ % |
|---|---|---|
| 6.85-6.60 | 12.89-13.39 | vs |
| 12.99-12.75 | 6.81-6.94 | m |
| 13.74-13.51 | 6.44-6.55 | m |
| 15.13-14.85 | 5.85-5.96 | w-m |
| 18.87-18.47 | 4.70-4.80 | w-m |
| 19.24-18.83 | 4.61-4.71 | w-m |
| 19.67-19.36 | 4.51-4.58 | w-m |
| 23.97-23.71 | 3.71-3.75 | w |
| 24.92-24.64 | 3.57-3.61 | w-m |
| 25.88-25.58 | 3.44-3.48 | w |
| 27.08-26.67 | 3.29-3.34 | w |
| 28.22-27.86 | 3.16-3.20 | w |
| 29.26-28.97 | 3.05-3.08 | w |
| 29.76-29.55 | 3.00-3.02 | w-m |
| 30.38-30.06 | 2.94-2.97 | w-m |
| 30.92-30.48 | 2.89-2.93 | w-s |
| 31.59-31.36 | 2.83-2.85 | w |
| 33.67-33.41 | 2.66-2.68 | w-m |
| 49.50-49.21 | 1.84-1.85 | w-m |
| 52.88-52.55 | 1.73-1.74 | w-m |

An embodiment of the invention is one, any or all of prior embodiments in this paragraph up through the first embodiment in this paragraph where M is La, Ce, Pr, Nd, Pm, Sm, Eu, Gd, or Dy, or mixtures thereof, and the material is characterized by the X-ray diffraction pattern having at least the d-spacings and relative intensities set forth in Table B

TABLE B

| 2-Θ | d(Å) | I/I0% |
|---|---|---|
| 11.71-11.45 | 7.55-7.72 | m |
| 12.56-12.30 | 7.04-7.19 | w-m |
| 13.53-13.26 | 6.54-6.67 | m-vs |
| 13.83-13.59 | 6.40-6.51 | m-vs |
| 17.14-16.87 | 5.17-5.25 | m-vs |
| 21.03-20.79 | 4.22-4.27 | w-m |
| 21.39-21.14 | 4.15-4.20 | m |
| 23.39-23.21 | 3.80-3.83 | w-m |

TABLE B-continued

| 2-Θ | d(Å) | I/I0% |
|---|---|---|
| 24.78-24.57 | 3.59-3.62 | w-m |
| 26.59-26.35 | 3.35-3.38 | vs |
| 27.00-26.83 | 3.30-3.32 | w-s |
| 27.77-27.51 | 3.21-3.24 | m-vs |
| 28.04-27.86 | 3.18-3.20 | w-m |
| 28.49-28.31 | 3.13-3.15 | w-m |
| 29.86-29.66 | 2.99-3.01 | w-m |
| 34.60-34.06 | 2.59-2.63 | m |
| 35.31-34.88 | 2.54-2.57 | m |
| 36.34-36.04 | 2.47-2.49 | w-m |
| 39.67-38.61 | 2.27-2.33 | w |
| 45.31-44.83 | 2.00-2.02 | m |

An embodiment of the invention is one, any or all of prior embodiments in this paragraph up through the first embodiment in this paragraph where M is a mixture of rare-earth elements containing less than 50% of La, Ce, Pr, Nd, Pm, Sm, Eu, Gd, or Dy, or mixtures thereof and has the diffraction pattern described in Table A. An embodiment of the invention is one, any or all of prior embodiments in this paragraph up through the first embodiment in this paragraph where M is a mixture of rare-earth elements containing less than 50% of Ho, Er, Tm, Yb, Lu, Y, or Sc, or mixtures thereof and has the diffraction pattern set forth in Table B. An embodiment of the invention is one, any or all of prior embodiments in this paragraph up through the first embodiment in this paragraph where A is sodium and M' is bismuth. An embodiment of the invention is one, any or all of prior embodiments in this paragraph up through the first embodiment in this paragraph where x=0. The rare-earth silicate material of claim 1 where A is an organoammonium or ammonium cation. An embodiment of the invention is one, any or all of prior embodiments in this paragraph up through the first embodiment in this paragraph where A is a mixture of sodium and another alkali metal selected from lithium, potassium, rubidium, or cesium. An embodiment of the invention is one, any or all of prior embodiments in this paragraph up through the first embodiment in this paragraph where the rare earth element is in a polyhedral bonding geometry with a coordination number greater than 6. An embodiment of the invention is one, any or all of prior embodiments in this paragraph up through the first embodiment in this paragraph where the M' element is selected from a group comprising zinc (+2), iron (+3), zirconium (+4), titanium (+4), niobium (+5), antimony (+5), and mixtures thereof. An embodiment of the invention is one, any or all of prior embodiments in this paragraph up through the first embodiment in this paragraph further characterized in that the A cation has been exchanged for a secondary cation A' selected from the group consisting of alkali metal cations, alkaline earth metal cations, hydronium cations, ammonium cations, a transition metal cation with valence of +2 or +3, a rare-earth cation and mixture thereof.

A second embodiment of the invention is a process of preparing a rare-earth silicate ion exchange composition comprised of $[SiO_{4/2}]$ tetrahedra, $[MO_{6/y}]^{z-}$ octahedra, and $[M'_{6/y}]^{z-}$ octahedral units having one of two novel frameworks, depending on the choice of the rare-earth cation, identified by their empirical formulas on an anhydrous basis of $A'^{r+}_p M^{s+}_{1-x} M'^{t+}_x Si_n O_m$ where A is an exchangeable cation selected from the group consisting of alkali metals, alkaline earth metals, hydronium ion, ammonium ion, and mixtures thereof, "r" is the weighted average valence of A and varies from 1 to 2, "p" is the mole ratio of A to total metal (total metal=M+M') and varies from about 2 to about 5, M is at least one element selected from the group of rare-earth elements, "s" is the weighted average valence of M and varies from 3 to 4, "(1-x) is the mole fraction of total metal that is M and varies from 0.01 to 1, M' is a framework metal having a valence of +2, +3, +4, or +5, "t" is the weighted average valence of M' and varies from 2 to 5, "x" is the mole fraction of total metal that is M' and varies from 0 to 0.99, "n" is the mole ratio of Si to total metal and has a value of about 5 to about 10, and "m" is the mole ratio of O to total metal and is given by $$m = \frac{[(r \cdot p) + (s \cdot (1-x)) + (t \cdot x) + (4 \cdot n)]}{2}$$

and when M is Ho, Er, Tm, Yb, Lu, Y or Sc, the material is characterized by the X-ray diffraction pattern having at least the d-spacings and relative intensities set forth in Table A

TABLE A

| 2-Θ | d(Å) | I/I$_0$% |
| --- | --- | --- |
| 6.85-6.60 | 12.89-13.39 | vs |
| 12.99-12.75 | 6.81-6.94 | m |
| 13.74-13.51 | 6.44-6.55 | m |
| 15.13-14.85 | 5.85-5.96 | w-m |
| 18.87-18.47 | 4.70-4.80 | w-m |
| 19.24-18.83 | 4.61-4.71 | w-m |
| 19.67-19.36 | 4.51-4.58 | w-m |
| 23.97-23.71 | 3.71-3.75 | w |
| 24.92-24.64 | 3.57-3.61 | w-m |
| 25.88-25.58 | 3.44-3.48 | w |
| 27.08-26.67 | 3.29-3.34 | w |
| 28.22-27.86 | 3.16-3.20 | w |
| 29.26-28.97 | 3.05-3.08 | w |
| 29.76-29.55 | 3.00-3.02 | w-m |
| 30.38-30.06 | 2.94-2.97 | w-m |
| 30.92-30.48 | 2.89-2.93 | w-s |
| 31.59-31.36 | 2.83-2.85 | w |
| 33.67-33.41 | 2.66-2.68 | w-m |
| 49.50-49.21 | 1.84-1.85 | w-m |
| 52.88-52.55 | 1.73-1.74 | w-m | and when M is La, Ce, Pr, Nd, Pm, Sm, Eu, Gd, or Dy, and the material is characterized by the X-ray diffraction pattern having at least the d-spacings and relative intensities set forth in Table B

TABLE B

| 2-Θ | d(Å) | I/I$_0$% |
| --- | --- | --- |
| 11.71-11.45 | 7.55-7.72 | m |
| 12.56-12.30 | 7.04-7.19 | w-m |
| 13.53-13.26 | 6.54-6.67 | m-vs |
| 13.83-13.59 | 6.40-6.51 | m-vs |
| 17.14-16.87 | 5.17-5.25 | m-vs |
| 21.03-20.79 | 4.22-4.27 | w-m |
| 21.39-21.14 | 4.15-4.20 | m |
| 23.39-23.21 | 3.80-3.83 | w-m |
| 24.78-24.57 | 3.59-3.62 | w-m |
| 26.59-26.35 | 3.35-3.38 | vs |
| 27.00-26.83 | 3.30-3.32 | w-s |
| 27.77-27.51 | 3.21-3.24 | m-vs |
| 28.04-27.86 | 3.18-3.20 | w-m |
| 28.49-28.31 | 3.13-3.15 | w-m |
| 29.86-29.66 | 2.99-3.01 | w-m |
| 34.60-34.06 | 2.59-2.63 | m |
| 35.31-34.88 | 2.54-2.57 | m |
| 36.34-36.04 | 2.47-2.49 | w-m |
| 39.67-38.61 | 2.27-2.33 | w |
| 45.31-44.83 | 2.00-2.02 | m | the process comprising forming a reaction mixture containing reactive sources of silicon, rare-earth metals (M), a framework metal and a cation alkali metals, alkaline earth metals, hydronium ion, ammonium ion, and mixtures thereof, and water and heating the reaction mixture at a temperature of about 100° C. to about 300° C. for a time sufficient to form the rare earth metallosilicate, the reaction mixture which in terms of molar ratios of the oxides is expressed by the following formula a A$_{2/m}$O 1-b MO$_{h/2}$ b M'O$_{g/2}$ c SiO$_2$ d H$_2$O where "a" has a value from about 1 to about 100, "m" is the valence of the A components and has values of +1 or +2, "b" has a value from zero to less than 1.0, "h" is the valence of the M components and has values of +3 or +4, "g" is the valence of the M' components and has values of +2, +3, +4, or +5, "c" has a value of about 0.5 to about 150, and "d" has a value from about 30 to about 10000. An embodiment of the invention is one, any or all of prior embodiments in this paragraph up through the first embodiment in this paragraph where a rare-earth metal precursor is first dissolved in an acidic solution prior to addition of a basic silicate solution. An embodiment of the invention is one, any or all of prior embodiments in this paragraph up through the first embodiment in this paragraph where the source of the rare-earth element is selected from the group consisting of rare earth element containing halides, nitrates, acetates, oxides, hydrous oxides, and mixtures thereof. An embodiment of the invention is one, any or all of prior embodiments in this paragraph up through the first embodiment in this paragraph wherein the silicon source is selected from colloidal silica, fumed silica, tetraorthosilicate and sodium silicate. An embodiment of the invention is one, any or all of prior embodiments in this paragraph up through the first embodiment in this paragraph wherein the reaction mixture is reacted at a temperature of about 100° C. to 300° C. for a period of 1 hour to about 30 days in a sealed reaction vessel under autogenous pressure.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

We claim as our invention:

1. An open framework microporous rare-earth silicate ion exchange composition comprised of [SiO$_{4/2}$] tetrahedra, [MO$_{6/y}$]$^{z-}$ octahedra, and [M'O$_{6/y}$]$^{z-}$ octahedral units having one of two novel frameworks, depending on the choice of the rare-earth cation, identified by their empirical formulas on an anhydrous basis of:

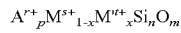

$$A^{r+}{}_p M^{s+}{}_{1-x} M'^{t+}{}_x Si_n O_m$$

where A is an exchangeable cation selected from the group consisting of alkali metals, alkaline earth metals, hydronium ion, ammonium ion, and mixtures thereof, "r" is the weighted average valence of A and varies from 1 to 2, "p" is the mole ratio of A to total metal (total metal=M+M') and varies from about 2 to about 5, M is at least one element selected from the group of rare-earth elements, "s" is the weighted average valence of M and varies from 3 to 4, "(1-x)" is the mole fraction of total metal that is M and varies from 0.01 to 1, M' is a framework metal having a valence of +2, +3, +4, or +5, "t" is the weighted average valence of M' and varies from 2 to 5, "x" is the mole fraction of total metal that is M' and varies from 0 to 0.99, "n" is the mole ratio of Si to total metal and has a value of about 5 to about 10, and "m" is the mole ratio of O to total metal and is given by $$m = \frac{[(r \cdot p) + (s \cdot (1-x)) + (t \cdot x) + (4 \cdot n)]}{2}$$

and when M is Ho, Er, Tm, Yb, Lu, Y or Sc, the material is characterized by the X-ray diffraction pattern having at least the d-spacings and relative intensities set forth in Table A:

TABLE A

| 2-Θ | d(Å) | $I/I_0$% |
|---|---|---|
| 6.85-6.60 | 12.89-13.39 | vs |
| 12.99-12.75 | 6.81-6.94 | m |
| 13.74-13.51 | 6.44-6.55 | m |
| 15.13-14.85 | 5.85-5.96 | w-m |
| 18.87-18.47 | 4.70-4.80 | w-m |
| 19.24-18.83 | 4.61-4.71 | w-m |
| 19.67-19.36 | 4.51-4.58 | w-m |
| 23.97-23.71 | 3.71-3.75 | w |
| 24.92-24.64 | 3.57-3.61 | w-m |
| 25.88-25.58 | 3.44-3.48 | w |
| 27.08-26.67 | 3.29-3.34 | w |
| 28.22-27.86 | 3.16-3.20 | w |
| 29.26-28.97 | 3.05-3.08 | w |
| 29.76-29.55 | 3.00-3.02 | w-m |
| 30.38-30.06 | 2.94-2.97 | w-m |
| 30.92-30.48 | 2.89-2.93 | w-s |
| 31.59-31.36 | 2.83-2.85 | w |
| 33.67-33.41 | 2.66-2.68 | w-m |
| 49.50-49.21 | 1.84-1.85 | w-m |
| 52.88-52.55 | 1.73-1.74 | w-m | and when M is La, Ce, Pr, Nd, Pm, Sm, Eu, Gd, or Dy, and the material is characterized by the X-ray diffraction pattern having at least the d-spacings and relative intensities set forth in Table B:

TABLE B

| 2-Θ | d(Å) | $I/I_0$% |
|---|---|---|
| 11.71-11.45 | 7.55-7.72 | m |
| 12.56-12.30 | 7.04-7.19 | w-m |
| 13.53-13.26 | 6.54-6.67 | m-vs |
| 13.83-13.59 | 6.40-6.51 | m-vs |
| 17.14-16.87 | 5.17-5.25 | m-vs |
| 21.03-20.79 | 4.22-4.27 | w-m |
| 21.39-21.14 | 4.15-4.20 | m |
| 23.39-23.21 | 3.80-3.83 | w-m |
| 24.78-24.57 | 3.59-3.62 | w-m |
| 26.59-26.35 | 3.35-3.38 | vs |
| 27.00-26.83 | 3.30-3.32 | w-s |
| 27.77-27.51 | 3.21-3.24 | m-vs |
| 28.04-27.86 | 3.18-3.20 | w-m |
| 28.49-28.31 | 3.13-3.15 | w-m |
| 29.86-29.66 | 2.99-3.01 | w-m |
| 34.60-34.06 | 2.59-2.63 | m |
| 35.31-34.88 | 2.54-2.57 | m |
| 36.34-36.04 | 2.47-2.49 | w-m |
| 39.67-38.61 | 2.27-2.33 | w |
| 45.31-44.83 | 2.00-2.02 | m. | wherein the ion exchange composition is obtained using a process where a rare-earth metal precursor is first dissolved in an acidic solution prior to addition of a basic silicate solution.

2. The rare-earth silicate of claim 1 where M is Ho, Er, Tm, Yb, Lu, Y, or Sc, or mixtures thereof, and the material is characterized by the X-ray diffraction pattern having at least the d-spacings and relative intensities set forth in Table A:

TABLE A

| 2-Θ | d(Å) | $I/I_0$% |
|---|---|---|
| 6.85-6.60 | 12.89-13.39 | vs |
| 12.99-12.75 | 6.81-6.94 | m |
| 13.74-13.51 | 6.44-6.55 | m |
| 15.13-14.85 | 5.85-5.96 | w-m |
| 18.87-18.47 | 4.70-4.80 | w-m |
| 19.24-18.83 | 4.61-4.71 | w-m |
| 19.67-19.36 | 4.51-4.58 | w-m |
| 23.97-23.71 | 3.71-3.75 | w |
| 24.92-24.64 | 3.57-3.61 | w-m |
| 25.88-25.58 | 3.44-3.48 | w |
| 27.08-26.67 | 3.29-3.34 | w |
| 28.22-27.86 | 3.16-3.20 | w |
| 29.26-28.97 | 3.05-3.08 | w |
| 29.76-29.55 | 3.00-3.02 | w-m |
| 30.38-30.06 | 2.94-2.97 | w-m |
| 30.92-30.48 | 2.89-2.93 | w-s |
| 31.59-31.36 | 2.83-2.85 | w |
| 33.67-33.41 | 2.66-2.68 | w-m |
| 49.50-49.21 | 1.84-1.85 | w-m |
| 52.88-52.55 | 1.73-1.74 | w-m. |

3. The rare-earth silicate of claim 1 where M is La, Ce, Pr, Nd, Pm, Sm, Eu, Gd, or Dy, or mixtures thereof, and the material is characterized by the X-ray diffraction pattern having at least the d-spacings and relative intensities set forth in Table B:

TABLE B

| 2-Θ | d(Å) | $I/I_0$% |
|---|---|---|
| 11.71-11.45 | 7.55-7.72 | m |
| 12.56-12.30 | 7.04-7.19 | w-m |
| 13.53-13.26 | 6.54-6.67 | m-vs |
| 13.83-13.59 | 6.40-6.51 | m-vs |
| 17.14-16.87 | 5.17-5.25 | m-vs |
| 21.03-20.79 | 4.22-4.27 | w-m |
| 21.39-21.14 | 4.15-4.20 | m |
| 23.39-23.21 | 3.80-3.83 | w-m |
| 24.78-24.57 | 3.59-3.62 | w-m |
| 26.59-26.35 | 3.35-3.38 | vs |
| 27.00-26.83 | 3.30-3.32 | w-s |
| 27.77-27.51 | 3.21-3.24 | m-vs |
| 28.04-27.86 | 3.18-3.20 | w-m |
| 28.49-28.31 | 3.13-3.15 | w-m |
| 29.86-29.66 | 2.99-3.01 | w-m |
| 34.60-34.06 | 2.59-2.63 | m |
| 35.31-34.88 | 2.54-2.57 | m |
| 36.34-36.04 | 2.47-2.49 | w-m |
| 39.67-38.61 | 2.27-2.33 | w |
| 45.31-44.83 | 2.00-2.02 | m. |

4. The rare-earth silicate material of claim 1 where M is a mixture of rare-earth elements containing less than 50% of La, Ce, Pr, Nd, Pm, Sm, Eu, Gd, or Dy, or mixtures thereof and has the diffraction pattern described in Table A.

5. The rare-earth silicate material of claim 1 where M is a mixture of rare-earth elements containing less than 50% of Ho, Er, Tm, Yb, Lu, Y, or Sc, or mixtures thereof and has the diffraction pattern set forth in Table B.

6. The rare-earth silicate material of claim 1 where A is sodium and M' is bismuth.

7. The rare-earth silicate material of claim 1 where x=0.

8. The rare-earth silicate material of claim 1 where A is an organoammonium or ammonium cation.

9. The rare-earth silicate material of claim 1 where A is a mixture of sodium and another alkali metal selected from lithium, potassium, rubidium, or cesium.

10. The rare-earth silicate material of claim 1 where said rare earth element is in a polyhedral bonding geometry with a coordination number greater than 6.

11. The rare-earth silicate material of claim 1 where the M' element is selected from a group comprising zinc (+2), iron (+3), zirconium (+4), titanium (+4), niobium (+5), antimony (+5), tin (+4) and mixtures thereof.

12. The rare-earth silicate material of claim 1 further characterized in that the A cation has been exchanged for a secondary cation A' selected from the group consisting of alkali metal cations, alkaline earth metal cations, hydronium cations, ammonium cations, a transition metal cation with valence of +2 or +3, a rare-earth cation and mixture thereof.

\* \* \* \* \*